United States Patent
Erola et al.

(10) Patent No.: US 7,724,705 B2
(45) Date of Patent: May 25, 2010

(54) WIRELESS TRANSFER OF DATA

(75) Inventors: Timo Erola, Turku (FI); Mikko Juhola, Muurla (FI); Jakke Mäkelä, Turku (FI)

(73) Assignee: Nokia Corporation, Espoo (FI)

( * ) Notice: Subject to any disclaimer, the term of this patent is extended or adjusted under 35 U.S.C. 154(b) by 2198 days.

(21) Appl. No.: 10/390,548

(22) Filed: Mar. 14, 2003

(65) Prior Publication Data

US 2004/0179545 A1    Sep. 16, 2004

(51) Int. Cl.
*H04Q 7/00* (2006.01)
(52) U.S. Cl. .................................. 370/331; 455/41.2
(58) Field of Classification Search .................. None
See application file for complete search history.

(56) References Cited

U.S. PATENT DOCUMENTS

| | | | |
|---|---|---|---|
| 3,955,140 A * | 5/1976 | Stephens et al. | 455/68 |
| 6,275,932 B1 | 8/2001 | Yamaguchi et al. | |
| 6,529,802 B1 | 3/2003 | Kawakita et al. | |
| 6,728,632 B2 | 4/2004 | Medl | 701/207 |
| 2002/0044549 A1* | 4/2002 | Johansson et al. | 370/386 |
| 2002/0049059 A1 | 4/2002 | Soininen | |
| 2004/0203382 A1* | 10/2004 | Park | 455/41.2 |
| 2005/0036476 A1* | 2/2005 | Eaton et al. | 370/349 |

FOREIGN PATENT DOCUMENTS

| | | |
|---|---|---|
| DE | 19740934 A1 | 4/1999 |
| EP | 1220501 | 7/2002 |
| EP | 1398982 A1 | 3/2004 |
| EP | 1458136 A1 | 9/2004 |
| KR | 2001-0052807 | 6/2001 |
| KR | 2001-113731 | 12/2001 |
| WO | 0028403 | 5/2000 |
| WO | 00/54523 | 9/2000 |
| WO | 0145319 | 6/2001 |

OTHER PUBLICATIONS

Korean Office Action dated Apr. 6, 2007 citing KR 2001-10052807.
Korean Office Action citing KR 2001-113731 with full explanation of reasons for rejecting claims based thereon.
"Smart-Its Friends: A Technique for Users to Easily Establish Connections Between Smart Artefacts", Holmquist et al., Proceedings of the 2001 UBICOMP Conference at Atlanta, Sep. 30, 2001.
"That One There! Pointing to Establish Device Identity", Swindells et al., Proceedings of the 15th Annual ACM Symposium on User Interface Software and Technology, vol. 4, No. 2, Oct. 27, 2002.

* cited by examiner

*Primary Examiner*—Ricky Ngo
*Assistant Examiner*—Phuongchau Ba Nguyen

(57) ABSTRACT

The invention relates to a method of initiating a wireless transfer of data between two electronic devices. In order to make the initiation particularly user friendly, it is proposed that a concept called "hugging" is employed. A hugging state between two electronic devices is assumed to be given if a first electronic device and a second electronic device are determined to undergo a specific motion pattern relative to each other while being at least in close vicinity to each other. Only in case such a hugging state is detected at a first device, a data transfer channel is opened for transferring data between the first device and some other device, e.g. the second device. The invention relates equally to a corresponding device and to a software program product with a corresponding software code.

18 Claims, 2 Drawing Sheets

WIRELESS TRANSFER OF DATA

FIELD OF THE INVENTION

The invention relates to a method of initiating a wireless transfer of data between at least two of at least two electronic devices. The invention relates equally to an electronic device which is suited to initiating such a wireless transfer of data, and to a software program product in which a software code for initiating a wireless transfer of data between two electronic devices is stored.

BACKGROUND OF THE INVENTION

It is known from the state of the art to enable a direct wireless transfer of data between two electronic devices, e.g. for exchanging business cards between two mobile phones. The transmission channel can be realized for instance by Bluetooth™ (BT), by means of infrared (IR) ports or by means of a Wireless Local Access Network (WLAN).

An example of the employment of a local wireless link between two electronic devices is described in document WO 00/28403 A1. This document proposes the transmission not of data but of control information between a portable controller and devices, similarly as in a traditional remote control of devices.

Initiation protocols for data transfers between wireless terminals are described for instance in documents EP 1 220 501 A2 and WO 01/45319 A1.

It is a disadvantage of the known solutions that the activation and initiation of a direct wireless data transfer between two electronic devices is often considered to be complicated or annoying.

SUMMARY OF THE INVENTION

It is an object of the invention to simplify the direct, wireless transfer of data between two electronic devices from the point of view of the users of the electronic devices.

It is further an object of the invention to enable a direct, wireless transfer of data between two electronic devices in a form which constitutes a new experience to users of the electronic devices.

A method of initiating a wireless transfer of data between at least two of at least two electronic devices is proposed, which comprising at a first one of the electronic devices detecting a hugging state between the first electronic device and a second one of the electronic devices. A hugging state is assumed to be given if the first electronic device and the second electronic device are determined to undergo a specific motion pattern relative to each other while being at least in close vicinity to each other. The proposed method further comprises opening a data transfer channel as a local wireless link of the first electronic device for transferring data between the first electronic device and another than the first one of the electronic devices, when it has been detected that the first electronic device is in a hugging state with a second one of the electronic devices.

In addition, an electronic device is proposed which comprises at least one interface for establishing a local wireless link to other electronic devices and processing components for realizing the proposed method.

Finally, a software program product is proposed in which a software code for initiating a wireless transfer of data between at least two of at least two electronic devices is stored. The proposed software code realizes the steps of the proposed method, when run in a processing unit of an electronic device.

The invention relies on a concept which is referred to as "hugging". The exact definition of this term and thus of the required motion pattern can be specific to a given application. The motion pattern, which should be specific and unambiguous, may comprise a single motion or a sequence of motions performed by the users of the devices with the devices at least in close vicinity to each other. In the simplest embodiment, "hugging" means that two electronic devices are brought together physically, i.e. tapped together, or at least very close to each other. In other embodiments, "hugging" could require other, more complex motion patterns, such as sliding two electronic devices close to each other. In the most general case, the "hugging" only needs to fulfill the following criteria: The operation allows a user to define unambiguously which device he wishes to "hug" with his own device, and each of the devices can make an independent determination of whether it is probably being "hugged" by another device.

The electronic devices according to the invention will also be referred to as hug-enabled electronic devices.

The invention proceeds from the consideration that the initiation of a data transfer between two electronic devices would be particularly easy and intuitive, if this data transfer was initiated simply by entering a hugging state between two electronic devices, e.g. by bringing two electronic devices into physical contact. A channel providing the full-bandwidth required for the data transfer is only activated in case such a "hugging" has been detected.

The invention thus provides a new way to transfer images or other data between electronic devices by initiating the data transfer simply by bringing respectively two electronic devices into a hugging state.

It is an advantage of the invention that it provides an extremely intuitive user interface for a data transfer between electronic devices.

It is further an advantage of the invention that it can be implemented in some electronic devices, e.g. at least in some future mobile phone categories, without any hardware changes.

In the simplest embodiment, a hugging state is detected by a mechanical or electrical activation. In such an embodiment, the entry of a hugging state can be detected basically unambiguously and free of errors. As a consequence, it is in principle impossible to detect a hugging state by accident. Such a definite detection of a hugging state could be achieved, for instance, when both devices contain a button, and pressing the devices together in a specific configuration causes both buttons to be pressed simultaneously.

In more important embodiments, the detection of a hugging state cannot be made quite this unambiguously. For these cases, the use of a polling mode is proposed, which requires only a very low bandwidth. First, the first electronic device opens a polling channel as a local wireless link. Then, the first electronic device transmits signals on the polling channel and receives signals on this polling channel. The exchanged signals can be for example "telemetry data" which is based on the results of some measurements at the involved electronic devices. Finally, the first electronic device determines whether it is in a hugging state with a corresponding second electronic device, which has equally opened a polling channel, by evaluating data measured by the first device and signals received via the polling channel. It is to be noted that the data measured by the first device can be results of measurements performed on the signals received via the polling channel.

There are various possibilities for causing an electronic device to enter the polling mode, i.e. to open a polling channel and to perform the required measurements and evaluations. A polling mode can be entered either upon initiation by a user, automatically or by a mixed approach. There may also be additional layers of security, which are not crucial for this invention.

In case the polling mode is to be initiated by a user, the initiation is preferably extremely simple. This can be achieved for example by providing a dedicated button which is to be pressed for entering the polling mode. Alternatively, pressing a predefined sequence of regular keys or any other suitable action can be required.

In case the polling mode is to be entered automatically, it may be entered whenever a regular sampling of a polling channel in a low-energy QUICK_POLL_CHECK_MODE shows that a second electronic device nearby is in a polling mode. Such a regular sampling may take place for instance every few seconds. While this approach is particularly comfortable for the user, it has to be taken into account that it requires power overhead from the electronic equipment and also has potential security weaknesses. The polling mode could also be entered automatically whenever it is determined in any suitable way that a corresponding second electronic device, or at least any other object, is very close. Moreover, the polling state can be entered automatically whenever data of a predetermined type is uniquely identified in the first electronic device, e.g. when user-generated images are displayed on a screen of an electronic device, when audio signals are made available to the user, or when thumbprints or hyperlinks appear on the screen.

Some possibilities of entering the polling mode have to be combined with at least one other possibility of entering the polling mode, in order to enable two electronic devices to initiate a transfer of data. In one possible embodiment, for example, various hug-enabled electronic devices are by default in the above presented QUICK_POLL_CHECK_MODE. Whenever data of a certain type of data is uniquely identified in one of the electronic devices, this electronic device is caused automatically to enter the polling mode. If there is further one of the other hug-enabled electronic devices within the transmission range of the first electronic device, it will eventually detect that the first electronic device is in the polling mode during the regular sampling of the polling channel and also enter the polling mode. The data transfer can then be activated as proposed via "hugging".

There are also various possibilities for determining whether the first electronic device is in a hugging state with a second electronic device which has equally opened a polling channel.

In one preferred embodiment, proximity sensors are used for proximity measurements in the polling mode. The proximity sensors could operate, for instance, based on optical, electromagnetic, electrostatic, magnetic, or other principles. When an electronic device enters the polling mode, it switches on its proximity sensor. If the proximity sensor detects another object in the proximity, the electronic device transmits a flag on the opened polling channel. In case the electronic devices also receives a corresponding flag on the polling channel basically at the same time, it is a reasonable guess that two hug-enabled electronic devices have been brought close together and thereby entered a hugging state. The invention thus opens the possibility of a new use of proximity sensors.

In another preferred embodiment, existing Infrared Data Association (IrDA) ports are made use of for proximity measurements in the polling mode. An IrDA port of an electronic device is set to a mode in which the IrDA port emits infrared signals with a specified intensity. At the same time, the electronic device polls for infrared signals received via the IrDA port. In case the intensity of received infrared signals corresponds to a predefined intensity which can be expected if the first electronic device and the second electronic device undergo the specific motion pattern relative to each other, a hugging state can be assumed. Depending on the selected motion pattern, the expected intensity can be for instance basically equal to the specified intensity or a known time-dependent function. For example, when the intensity of a received infrared signal is almost the same as the intensity of the transmitted infrared signal, it can be assumed that the IrDA port of the electronic device is more or less touching the IrDA port of another electronic device in the polling mode. Fuzzy reasoning may be employed to determine whether or not the first electronic device should actually be considered to be in a hugging state with a second electronic device which has equally opened a polling channel.

In another preferred embodiment, acceleration sensors are used for proximity measurements in the polling mode. In case the acceleration sensors of two hug-enabled electronic devices register at the same time an acceleration-deceleration profile which can be expected at the respective electronic device in case it undergoes the specific motion pattern, this means that most likely they have entered a hugging state. The acceleration-deceleration profile may consist in a single value, but also be a more complex function of time, depending on the definition of the specific motion pattern. The required exchange of information in the form of an acceleration indication is carried out via the initialized polling channel. Fuzzy reasoning may be employed to determine whether or not the first electronic device should actually be considered to be in a hugging state with a second electronic device which has equally opened a polling channel.

In yet another preferred embodiment, the polling channel itself could be used for proximity measurements in the polling mode. The hug-enabled electronic devices transmit signals on the opened polling channel. It is then assumed by the first device that it is in a hugging state with some other hug-enabled device, in case a measured intensity of signals received on the polling channel behaves according to a predefined function of time which can be expected in case the first and the second electronic device undergo the selected specific motion pattern. For example, in case the electronic devices detect that the channel intensity grows quickly and then stays at the maximum possible value, most likely the electronic devices have been touched together. Fuzzy reasoning may be employed to determine whether or not an electronic device should actually be considered to be in a hugging state with another electronic device which has equally opened a polling channel. In case the polling channel is based on Bluetooth™, in addition the adaptivity of the Bluetooth™ channel intensity has to be taken into account for making the approach robust.

Further possibilities for detecting a hugging state include for instance an audio-based proximity sensing, in which the devices listen to audio signals emitted by other devices, a detection which is based on the sound of a contact, e.g. the tapping sound caused if the devices are brought in contact quickly, a detection using application-specific contact sensors, e.g. small rods that bend when in or near contact, a visual identification of the "hugging" motion, e.g. with a camera equipped with motion sensing, and any other method capable of sensing close proximity and the specific motion used to perform the "hugging". The specific mechanism used for the detection of the hugging state is not relevant for the basic concept of this invention, especially if a multi-input reasoning is used, as described below, which ensures that possible systematic, random or unpredictable skews, errors or operational failures in any single mechanism can be offset by the respective other mechanisms.

Advantageously, the final decision whether or not an electronic device should be considered to be in a hugging state with another electronic device is based on a plurality of criteria, e.g. based on several of the above proposed embodiments. The electronic device then makes a reasoning on whether it is possible that it has been "hugged". In practice, more than one proximity sensor should be employed to this end. A "hug" can be considered to be possible, for instance, if at the same time a proximity sensor detects a close object and infrared signals are being received at a high intensity and the electronic device has experienced a deceleration.

In a further embodiment, the polling channel is not switched on by default. Instead, each hug-enabled electronic device constantly or regularly searches for another electronic device close by itself, e.g. according to one of the possibilities presented above. This embodiment is usable in particular in cases in which the power consumption is not a key issue, e.g. when the device is a tabletop application, or in cases in which the searching can be performed with very little power consumption.

If the electronic device decides that a "hug" is possible, it opens the polling channel and sends a QUERY_FOR_OTHER_DEVICE signal querying for other hug-enabled electronic devices. If the electronic device receives simultaneously a QUERY_FOR_OTHER_DEVICE signal from another electronic device, it is possible that the two devices are in a hugging state. Thereupon, additional information should be transferred between the electronic devices, and the data transfer channel is activated if the additional information shows that a "hugging" has actually occurred. In order to avoid potential security problems with an electronic device that polls other electronic devices even when the user is not aware of it, this mode could be entered only at the request of the user.

Compared to the last presented embodiment, the other proposed embodiments are more reliably likely not to miss a "hug". Moreover, they require less power consumption, since they do not require evaluations and polling all the time.

Also for realizing a transfer of data on the activated data transfer channel, there are several possibilities.

In a first possible mode of operation, the proposed "hugging" is only used to initiate the data transfer channel, after which the channel is used exactly as it would be used normally, for instance as a Bluetooth™ data transfer channel using Bluetooth protocols. It is an advantage of this mode of operation that it does not require the definition of new data types or transmission protocols.

In a second possible mode of operation, the proposed "hugging" is used to transfer objects between two electronic devices, e.g. to transfer images from display to display. For this mode of operation, security aspects should be taken into account, and also the digital rights management protection for a "hugging" transfer should be at least as stringent as for other channels. In practice, a new "ENABLE_HUGGING_TRANSFER" flag could be defined and assigned to every object which shall be allowed to be transferred. It is not necessary to add this flag explicitly to most object definitions, however, since it can be ON by default for any type of object that can be exchanged by infrared signals, Bluetooth™, Short Message Service (SMS), Multimedia Messaging Services (MMS), and so on, for instance for all icons, all business/contact cards, for images with some restrictions, etc.

In an advantageous embodiment, the objects to be moved are always formatted as MMSs or SMSs, with an additional "TRANSFER_BY_HUGGING" flag turned on. The user interface can then treat them exactly as if they were ordinary MMSs. Any necessary additional fields, e.g. a field containing the phone number of the sender, can be sent together with the MMS data. Thereby, it is in principle irrelevant for the receiving electronic device, whether the MMS was received via the ordinary air interface or by "hugging".

The data transfer can be initialized between the first electronic device and the second electronic device, between which a hugging state is detected. Another advantageous embodiment of the invention enables a "three-way hugging". In this case, the second electronic device is only employed for initializing a data transfer between the first electronic device and some other electronic device. The second electronic device is used more specifically to "hug" the first electronic device and one or more other electronic devices one after the other. The first electronic device and all of the other electronic devices open a data transfer channel, as soon as they detect that they have been "hugged" by the second device. Thereby, the second electronic device enables a data transfer between the first electronic device and one or more other electronic devices. This is particularly useful, if the first electronic device and the other electronic devices are too large to be moved themselves to enter a direct hugging state among each other.

The polling channel and the data transfer channel, respectively, can be established for instance as Bluetooth™ channel, WLAN channel, IrDA channel, etc. It is to be noted that in an optimal embodiment involving only two electronic devices, both channels will make use of the same physical channel, only the type of data which is transferred changes.

The invention can in principle be implemented with existing technology and hardware. If a device already contains at least one of the technologies mentioned above, the invention can be implemented fully in software. Additional hardware can make the invention more robust.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
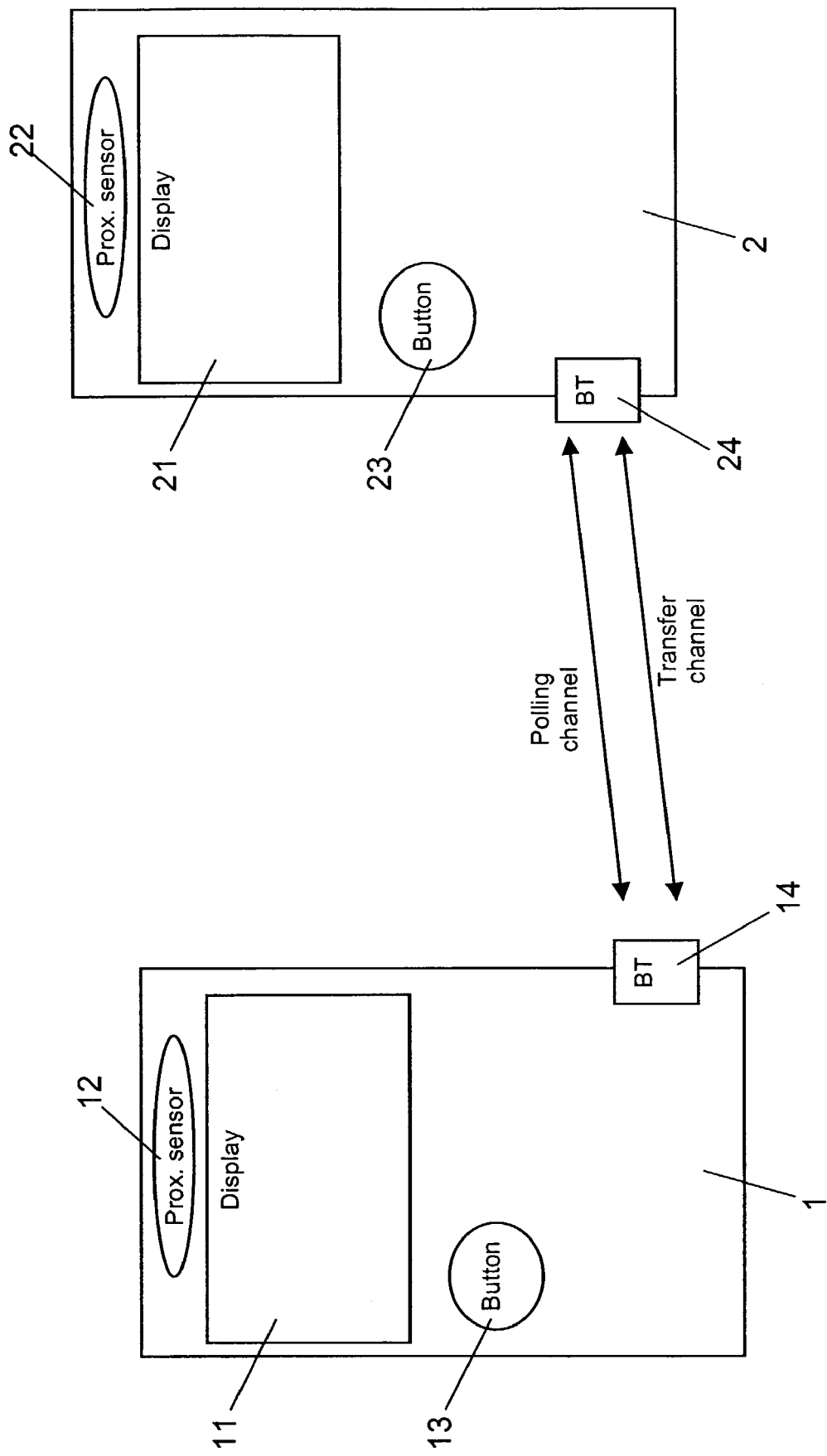
FIG. 1 schematically shows two mobile phones in which an embodiment of the invention is implemented.

FIG. 1 schematically presents two exemplary mobile phones 1, 2, which are able to initiate a transfer of data in accordance with the invention.

Each of the mobile phones 1, 2 comprises a graphical display 11, 21 and other components of conventional mobile phones (not shown). The mobile phones 1, 2 further comprise a respective proximity sensor 12, 22, and an initiation button 13, 23. In addition, each of the mobile phones 1, 2 comprises an interface 14, 24 for establishing a local wireless link to some other mobile phone. Finally, both mobile phones 1, 2 comprise a processing portion, which is not shown in FIG. 1.

Figure 2:
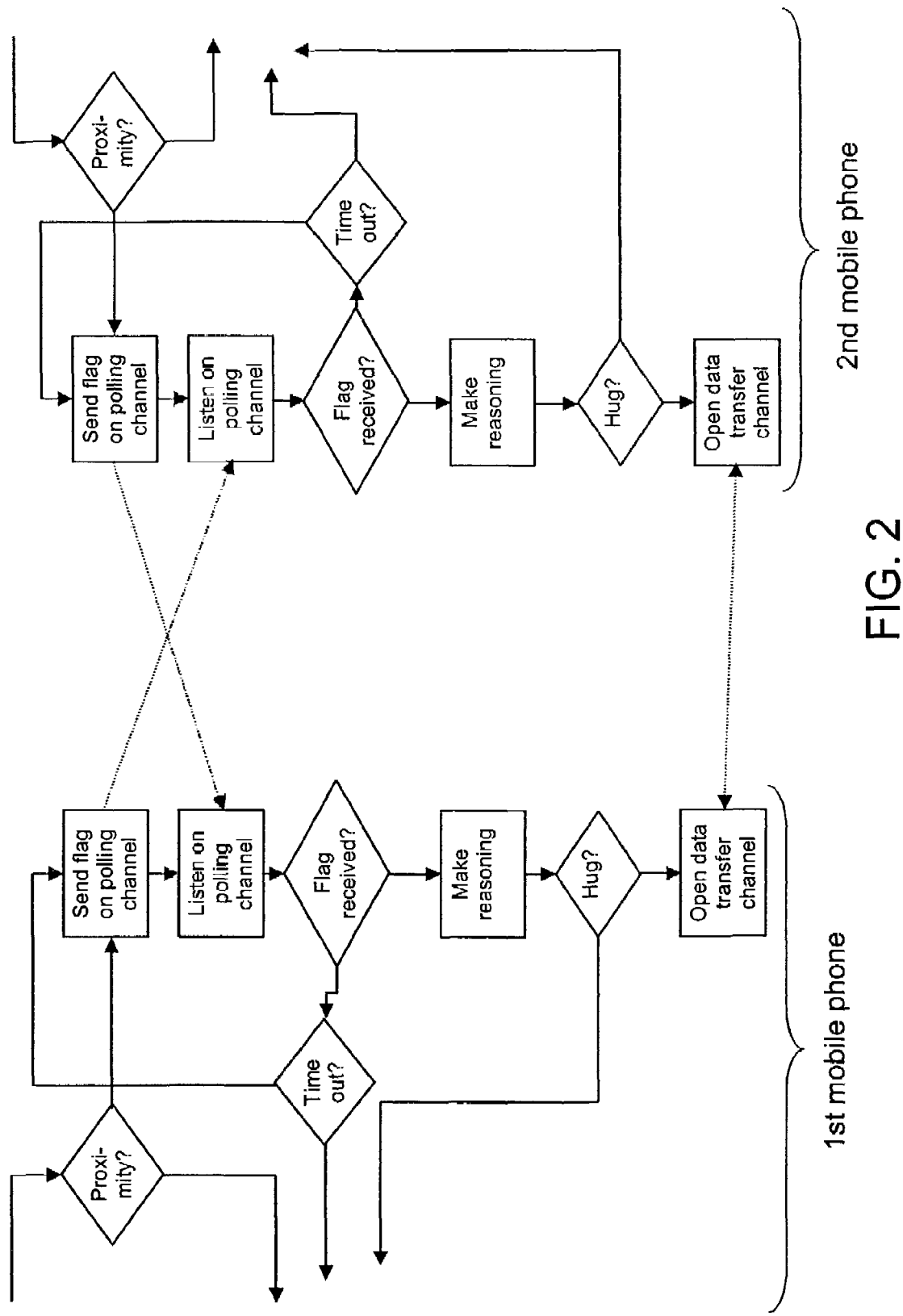
FIG. 2 is a flow chart illustrating the initiation of a data transfer between the mobile phones of FIG. 1.

The activation of a transfer of data between the two mobile phones 1, 2 will now be explained with reference to FIG. 2. FIG. 2 is a flow chart illustrating on the left hand side a processing in the processing portion of the first mobile phone 1 and on the right hand side a processing in the processing portion of the second mobile phone 2. The depicted part of the processing in both mobile phones 1, 2 is exactly the same.

In case a user of the first mobile phone 1 wishes to transfer an image, which is currently displayed on the graphical display 11 of his/her mobile phone 1, to the graphical display 21 of the second mobile phone 2, the users of both mobile phones 1, 2 press the respective initiation button 12, 22 of their phone 1, 2. As a result, a polling mode is entered by both mobile phones 1, 2. Entering the polling mode may be recorded within the phones by an "ENTER_POLLING_MODE" flag.

When the polling mode is entered, a polling channel is activated as a local wireless link with a very low bandwidth. The polling channel is activated more specifically as Bluetooth™ link via the interfaces 14, 24.

When the polling mode is entered, moreover the proximity sensors 12, 22 are switched on in both mobile phones 1, 2. Each of the proximity sensors 12, 22 checks thereupon, whether some object is detected in the vicinity.

In case the proximity sensor 12, 22 of one of the mobile phones 1, 2 detects an object in its vicinity, this mobile phone 1, 2 transmits a proximity flag on the polling channel, which is recorded in the transmitting phone 1, 2 by a "SEND_POLL_DATA" flag.

At the same time, the mobile phones 1, 2 listen on the polling channel.

In case a mobile phone 1, 2, which transmitted a proximity flag on the polling channel, does not receive a corresponding proximity flag from another mobile phone 2, 1 on the polling channel, it checks whether a counter in the mobile phone 1, 2 indicates a time out. As long as no time out is indicated, a loop is entered, in which the proximity flag is transmitted again by the mobile phone 1, 2, and in which the mobile phone 1, 2 continues listening on the polling channel. When a time out is indicated, in contrast, the polling mode is left by the mobile phone 1, 2, which is recorded in the mobile phone 1, 2 with a "LEAVE_POLLING_MODE" flag.

In case a mobile phone 1, 2, which transmitted a proximity flag on the polling channel, does receive a corresponding proximity flag from another mobile phone 2, 1 while listening on the polling channel, obviously another mobile phone 2, 1 which has entered the polling mode is present. The reception of a proximity flag is recorded in a mobile phone 1, 2 with a "RECEIVE_POLL_DATA" flag.

Next, a decision stage is entered, in which the mobile phone 1, 2 which received the proximity flag makes a reasoning whether or not the detected other mobile phone 2, 1 is basically in physical contact with the mobile phone 1, 2 which received the proximity flag. In the decision stage, one or more conditions may be checked to this end.

For example, in case a mobile phone 1, 2 receives a proximity flag from another mobile phone 2, 1 basically at the same time at which its own proximity sensor detects an object in the vicinity and transmits a first proximity flag on the polling channel, it can be assumed that the mobile phone 1, 2 has been brought into physical contact with another mobile phone 2, 1, i.e. that a hugging state is given. Further, all proximity flags may be transmitted with a specified intensity, and a hugging state can then also assumed to be given by a mobile phone 1, 2 in case a proximity flag from another mobile phone 2, 1 is received basically with the specified intensity.

In case the mobile phone 1, 2 comes to the conclusion in the decision stage that no hugging state is given, the polling channel is closed and the polling mode is left, which is recorded in the mobile phone 1, 2 with a "LEAVE_POLLING_MODE" flag. Further, the entire procedure is ended, until a user presses the respective initiation button 13, 23 again.

Also in case a hugging state is assumed to be given, the polling channel is closed and the polling mode is left, which is equally recorded in the mobile phone 1, 2 with a "LEAVE_POLLING_MODE" flag. Instead, however, a data transfer mode is entered, which is recorded in the mobile phone 1, 2 with an "ENTER_TRANSFER_MODE" flag.

When the data transfer mode is entered, a data transfer channel is activated as a local wireless link with a higher bandwidth. The data transfer channel is equally activated as Bluetooth™ link via the interfaces 14, 24 of the mobile phones 1, 2.

The activated data transfer channel is then used for transferring automatically those objects, which are currently displayed on the graphical display 11 of the first mobile phone 1 and to which a dedicated flag "ENABLE_HUGGING_TRANSFER" set to ON is associated, to the graphical display 21 of the second mobile phone 2.

The users of the two mobile phones 1, 2 thus get the impression that they have transferred an image directly from one display 11 to another display 21 simply by touching the mobile phones 1, 2 together. Therefore, the proposed initiation of the transmission implies an interesting psychological twist, and might be considered to constitute a "cute" feature of a mobile phone by certain groups of users.

The transmission of object data via the data transfer channel is recorded in the first mobile phone 1 with a "SEND_DATA" flag, while the reception of object data via the data transfer channel is recorded in the second mobile phone 2 with a "RECEIVE_DATA" flag.

When the transmission is terminated, the data transfer channel is closed and the data transfer mode is left, which is recorded in the mobile phones 1, 2 with a "LEAVE_TRANSFER_MODE" flag. Thereby, the entire procedure is ended, until a user presses the respective initiation button 13, 23 again.

It is understood that any other type of data could be transferred in the same manner between the two mobile phones, as long as the data to be transferred can be uniquely identified. Examples are audio signals which are currently being played, or data whose thumbprints or hyperlinks appear on the screen.

On the whole, it becomes apparent that the presented exemplary embodiment of the invention enables a particularly user-friendly transfer of objects from one mobile phone to another. It could be applied just the same for transferring data in a normal way via the established data transfer channel, e.g. by establishing the data transfer channel as a Bluetooth™ data transfer channel using Bluetooth™ protocols.

While there have shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of initiating a wireless transfer of data between at least two of at least two electronic devices, said method comprising at a first one of said electronic devices:

detecting a hugging state between said first electronic device and a second one of said electronic devices, a hugging state being assumed to be given if said first electronic device and said second electronic device are determined to undergo a specific motion pattern relative to each other while being at least in close vicinity to each other, wherein said detecting a hugging state comprises:

opening a polling channel as a local wireless link of said first electronic device;

transmitting signals on said polling channel and receiving signals on said polling channel; and determining whether said first electronic device is in a hugging state with a corresponding second electronic device by evaluating data measured by said first device and signals received via said polling channel; and opening a data transfer channel as a local wireless link of said first electronic device for transferring data between said first electronic device and another than said first one of said electronic devices, when it has been detected that said first electronic device is in a hugging state with a second one of said electronic devices.

2. The method according to claim 1, wherein a hugging state between said first electronic device and a second electronic device is detected by a detection of at least one of a mechanical and an electrical interaction between said first electronic device and a second electronic device.

3. The method according to claim 1, wherein said polling channel is opened by said first electronic device upon initiation by a user.

4. The method according to claim 1, wherein said first electronic device performs a regular sampling on said polling channel, and wherein said polling channel is opened automatically by said first electronic device, when said regular sampling of said polling channel shows that a second electronic device located in the vicinity is transmitting signals on said polling channel.

5. The method according to claim 1, wherein said polling channel is opened automatically by said first electronic device, when proximity measurements performed by said first electronic device indicate that a second electronic device is in the vicinity.

6. The method according to claim 1, wherein said polling channel is opened automatically by said first electronic device, when data of a predetermined type is currently uniquely identified in said first electronic device.

7. The method according to claim 1, further comprising performing at said first electronic device proximity measurements using a proximity sensor for detecting close objects when said polling channel is opened, wherein said first electronic device transmits a proximity indication on said polling channel in case a close object is detected by said proximity sensor, and wherein said first electronic device determines that it is in a hugging state with a second electronic device which has equally opened said polling channel, in case said first electronic devices receives basically at the time of transmission of said proximity indication a proximity indication transmitted by a second electronic device on said polling channel.

8. The method according to claim 1, wherein said first electronic device emits infrared signals of a specified intensity on said polling channel, polls for received infrared signals on said polling channel and determines the intensity of received infrared signals, and wherein said first electronic device determines that it is in a hugging state with a second electronic device which has equally opened said polling channel, in case the intensity of received infrared signals corresponds to a predefined intensity, which can be expected if said first electronic device and said second electronic device undergo said specific motion pattern relative to each other.

9. The method according to claim 1, further comprising determining the acceleration of said first electronic device using an acceleration sensor in said first electronic device when said polling channel is opened, wherein said first electronic device transmits an acceleration indication on said polling channel in case said acceleration sensor detects a predefined acceleration-deceleration profile which can be expected for said first electronic device in case said first electronic device and said second electronic device undergo said specific motion pattern relative to each other, and wherein said first electronic device determines that it is in a hugging state with a second electronic device which has equally opened said polling channel, in case said first electronic device receives basically at the time of transmission of said acceleration indication a corresponding acceleration indication transmitted by a second electronic device on said polling channel.

10. The method according to claim 1, wherein said first electronic device measures the intensity of signals received on said polling channel, and wherein said first electronic device determines that it is in a hugging state with a second electronic device which has equally opened said polling channel, in case a measured intensity of signals received on said polling channel behaves according to a predefined function of time which can be expected in case said first and said second electronic device undergo said specific motion pattern relative to each other.

11. The method according to claim 1, wherein said first electronic device determines based on at least one of the following approaches whether it is in a hugging state with a second electronic device which has equally opened said polling channel: an audio-based proximity sensing, a detection which is based on the sound of a contact, a detection using application-specific contact sensors, and a visual identification of said specific motion pattern.

12. The method according to claim 1, wherein said first electronic device only determines that it is in a hugging state with a second electronic device, in case a plurality of conditions are met which indicate that said first electronic device is in a hugging state with a second electronic device.

13. The method according to claim 1, wherein fuzzy reasoning is employed for determining whether said first electronic device is in a hugging state with a second electronic device.

14. The method according to claim 1, wherein said data is transferred in form of virtual objects.

15. The method according to claim 1, wherein said other than said first one of said electronic devices is the same as said second one of said electronic devices.

16. The method according to claim 1, where said other than said first one of said electronic devices is a third one of said electronic devices, said second electronic device functioning only as a medium for opening a data transfer channel for transferring data between said first electronic device and said third electronic device.

17. An electronic device comprising:
- at least one interface for establishing a local wireless link to other electronic devices;
- a processing component for opening a polling channel via said at least one interface;
- a processing component for causing a transmission of signals on said polling channel and a reception of signals on said polling channel;
- a processing component for determining whether said first electronic device is in a hugging state with a corresponding second electronic device, a hugging state being assumed to be given if said first electronic device and said second electronic device are determined to undergo a specific motion pattern relative to each other while being at least in close vicinity to each other, wherein said processing component for determining whether said first electronic device is in a hugging state with a corresponding second electronic device evaluates data measured by said first device and signals received via said polling channel; and
- a processing component for opening a data transfer channel via said at least one interface for enabling a transfer of data between said first electronic device and another than said first one of said electronic devices, when it has been determined that said first electronic device is in a hugging state with a second electronic device.

18. A software program product in which a software code for initiating a wireless transfer of data between at least two of at least two electronic devices is stored in a machine readable medium said software code realizing the following steps when running in a processing unit of a first one of said electronic devices:
- determining whether said first electronic device is in a hugging state with a corresponding second one of said electronic devices, a hugging state being assumed to be given if said first electronic device and said second electronic device are determined to undergo a specific motion pattern relative to each other while being at least in close vicinity to each other, wherein said determining whether said first electronic device is in a hugging state with a corresponding second one of said electronic devices comprises:
- opening a polling channel as a local wireless link of said first electronic device;
- transmitting signals on said polling channel and receiving signals on said polling channel; and
- determining whether said first electronic device is in a hugging state with a corresponding second electronic device by evaluating data measured by said first device and signals received via said polling channel; and
- opening a data transfer channel as a local wireless link of said first electronic device for transferring data between said first electronic device and another than said first one of said electronic devices when it has been determined that said first electronic device is in a hugging state with a second electronic device.

* * * * *